(No Model.)
I. B. OLMSTED
Steam Cooker.
No. 231,606.    Patented Aug. 24, 1880.
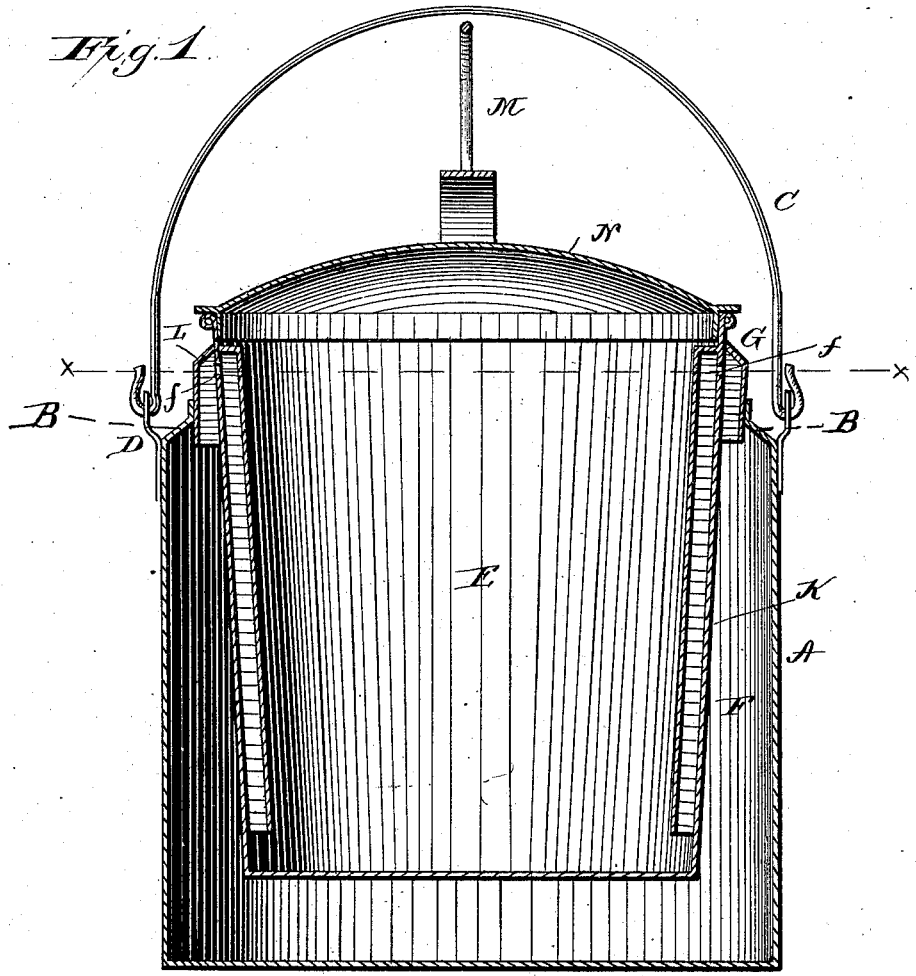
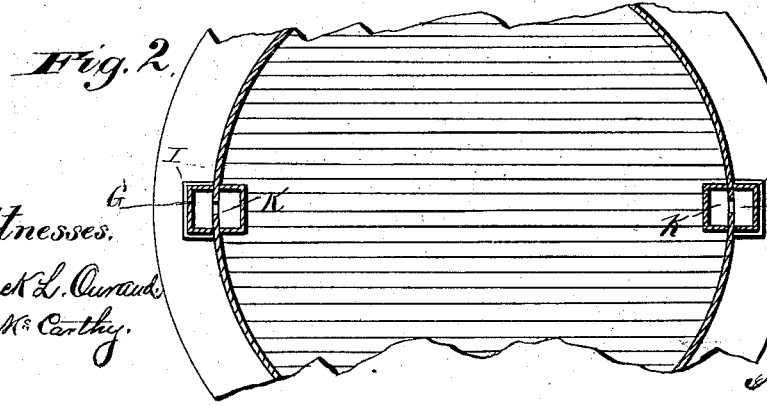

UNITED STATES PATENT OFFICE.

IRA B. OLMSTED, OF CHARLESTON, ILLINOIS.

STEAM-COOKER.

SPECIFICATION forming part of Letters Patent No. 231,606, dated August 24, 1880.

Application filed June 14, 1880. (No model.)

*To all whom it may concern:*

Be it known that I, IRA B. OLMSTED, of Charleston, in the county of Coles, and in the State of Illinois, have invented certain new and useful Improvements in Steam-Cookers; and I do hereby declare that the following is a full, clear, and exact description thereof, reference being had to the accompanying drawings, and to the letters of reference marked thereon, making a part of this specification.

This invention relates to certain improvements in steam-cookers; and it has for its objects to provide an apparatus by means of which food and other articles may be subjected to a boiling temperature without the direct application of fire, in order to prevent burning, and at the same time subjected to the direct application of steam to agitate the article and expose every portion to the action of heat to secure uniform and thorough cooking, as more fully hereinafter specified. These objects I attain by the apparatus illustrated in the accompanying drawings, in which—

Figure 1 represents a vertical sectional view of my improved apparatus, and Fig. 2 a horizontal sectional view thereof on the line x x of Fig. 1.

The letter A represents a cylindrical vessel of any desired size, constructed of sheet metal or other suitable material; B, the breast of the vessel, and C the bail secured to the ears D.

The letter E indicates a tapering vessel, somewhat larger at its upper end than the mouth of the vessel A, in which it is adapted to fit, the lower part projecting into said vessel A and extending nearly to the bottom of the same, leaving a space, F, between the two vessels. On the outside of the vessel E, near the top thereof, are two downwardly-opening passages, G, which are preferably located diametrically opposite each other, and are adapted to fit in the slots H at the edge of the breast B when the vessel E is in place. The said slots are cut from the outside of the breast inwardly, so as to form the burr on the inside, to prevent the water from being forced outward; and above each slot is formed or secured a short flange, I, for the purpose of forming a secure joint at such point.

The letter K indicates two vertical passages, formed on or secured to the inside of the inner vessel, E. The passages are closed at the top and open at the bottom, and extend from near the top of the vessel E to near the bottom of the same. The said passages K are directly opposite the passages G, and communicate with the upper part of the same by means of apertures L, by means of which steam is permitted to pass from the outer to the inner vessel, as more fully hereinafter set forth.

The inner vessel is provided with a bail, M, and a tightly-fitting cover, N, by which said vessel may be closed.

The operation of my invention is as follows: The vessel A is charged with water to the proper height—say just above the level of the bottom of the inner vessel, for instance—and the inner vessel is secured in place with the articles of food to be cooked. Upon applying heat to the outer vessel (which may be done by placing the vessel upon a stove or in any other convenient manner) the inner vessel will be heated, and the steam arising from the water when it reaches the boiling-point will be injected, through the passages G and K, into the contents of the inner vessel, thoroughly agitating the same and assisting the operation of cooking.

In order to provide effectually against the escape of water or steam between the joint of the inner and outer vessels, I prefer to solder the inner vessel to its seat at the mouth of the outer vessel, and in such case an aperture provided with a suitable stopper is formed in the breast of the outer vessel for filling.

Having thus fully described my invention, what I claim, and desire to secure by Letters Patent, is—

In combination with the outer vessel, A, provided with openings H in its breast B, the inner vessel, E, provided with the passages G and K, communicating with each other by apertures L, and with the respective outer and inner vessels, substantially as and for the purposes specified.

In testimony that I claim the foregoing I have hereunto set my hand this 7th day of June, 1880.

IRA B. OLMSTED.

Witnesses:
J. J. MCCARTHY,
JAMES E. LANSING.